US010647269B2

(12) United States Patent
Sakai

(10) Patent No.: US 10,647,269 B2
(45) Date of Patent: May 12, 2020

(54) CONNECTOR, CONNECTION STATE DETECTION SYSTEM AND TERMINAL

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Tatsurou Sakai, Mie (JP)

(73) Assignees: AutoNetworks Technologies, Ltd. (JP); Sumitomo Wiring Systems, Ltd. (JP); Sumitomo Electric Industries, Ltd. (JP)

( * ) Notice: Subject to any disclaimer, the term of this patent is extended or adjusted under 35 U.S.C. 154(b) by 0 days.

(21) Appl. No.: 16/086,380

(22) PCT Filed: Mar. 21, 2017

(86) PCT No.: PCT/JP2017/011162
§ 371 (c)(1),
(2) Date: Sep. 19, 2018

(87) PCT Pub. No.: WO2017/175576
PCT Pub. Date: Oct. 12, 2017

(65) Prior Publication Data
US 2019/0100160 A1     Apr. 4, 2019

(30) Foreign Application Priority Data

Apr. 5, 2016 (JP) .................................. 2016-075664

(51) Int. Cl.
*H01R 9/24*     (2006.01)
*H01R 13/02*    (2006.01)
(Continued)

(52) U.S. Cl.
CPC ....... *B60R 16/0207* (2013.01); *H01R 13/641* (2013.01); *H01R 13/6683* (2013.01)

(58) Field of Classification Search
CPC ..... H01R 13/03; H01R 43/16; H01R 23/7073
(Continued)

(56) References Cited

U.S. PATENT DOCUMENTS 3,818,415 A * 6/1974 Evans .................. H01R 4/2412
                                                    439/393
4,806,111 A * 2/1989 Nishi ..................... H01R 4/028
                                                    439/109
(Continued)

FOREIGN PATENT DOCUMENTS

JP    7-335308    12/1995
JP    11-103561   4/1999
(Continued)

OTHER PUBLICATIONS

International Search Report dated Jun. 13, 2017.

*Primary Examiner* — Abdullah A Riyami
*Assistant Examiner* — Thang H Nguyen
(74) *Attorney, Agent, or Firm* — Gerald E. Hespos; Michael J. Porco; Matthew T. Hespos

(57) ABSTRACT

A technique disclosed in this specification relates to a technique for detecting a location of a conduction failure due to aging degradation or the like by a simple method. A connector relating to the technique of this specification includes a connector housing (30) having a cavity (31) and a terminal (12) to be connected to a terminal (12A) serving as a mating conductive member across an insulating film (13) and accommodated into the cavity (31).

7 Claims, 4 Drawing Sheets

(51) Int. Cl.
  *B60R 16/02* (2006.01)
  *H01R 13/641* (2006.01)
  *H01R 13/66* (2006.01)

(58) Field of Classification Search
  USPC .................................................. 439/886, 887
  See application file for complete search history.

(56) References Cited

U.S. PATENT DOCUMENTS

| | | | | |
|---|---|---|---|---|
| 2010/0247747 | A1* | 9/2010 | Yamazaki ................ | C23C 14/12 427/66 |
| 2013/0273787 | A1* | 10/2013 | Mitose .................... | H01R 4/185 439/878 |
| 2015/0233980 | A1* | 8/2015 | Umetsu ................ | G01R 33/093 439/620.22 |
| 2015/0295366 | A1* | 10/2015 | Futakuchi .......... | H01R 13/6683 439/620.21 |
| 2016/0036151 | A1* | 2/2016 | Tominaga .............. | H01B 7/009 439/884 |

FOREIGN PATENT DOCUMENTS

| | | | | |
|---|---|---|---|---|
| JP | 2006-107863 | | 4/2006 | |
| JP | 2010-248629 | | 11/2010 | |
| JP | 2013-182861 | | 9/2013 | |
| JP | 2015-222688 | | 12/2015 | |
| JP | 2015222688 | A * | 12/2015 | ............. H01R 13/03 |

\* cited by examiner

CONNECTOR, CONNECTION STATE DETECTION SYSTEM AND TERMINAL

BACKGROUND

Field of the Invention

This specification relates to a connector, a connection state detection system and a terminal.

Related Art

Wiring harnesses and the like to be mounted in vehicles are required to have high energization reliability. Accordingly, circuit structures have been proposed to maintain energization reliability by detecting a location of a conduction failure due to aging degradation or the like. For example, Japanese Unexamined Patent Publication No. 2015-222688 discloses a circuit structure where a dummy line is prepared separately from a main line that is a normal electrical path. A conduction failure in the main line is detected based on a conduction failure of the dummy line, which is more susceptible to aging degradation than the main line.

The technique disclosed in Japanese Unexamined Patent Publication No. 2015-222688 requires processing to make the dummy line an electrical path more susceptible to aging degradation than the main line. Further, a configuration for detecting a conduction failure of the dummy line tends to be complicated.

The invention was developed to solve the problem described above and relates to a simple connection state detection system for detecting a location of a conduction failure due to aging degradation or the like.

SUMMARY

A first aspect of the invention relates to a connector housing having a first cavity. A first terminal is accommodated in the first cavity and is to be connected to a mating conductive member across an insulating film.

The connector housing may include at least a second cavity, and the connector may further include a second terminal to be connected electrically to a mating conductive member and accommodated in the second cavity. Accordingly, the first and second terminals are accommodated in different cavities in the same connector housing. Thus, both terminals are placed in similar environments. Therefore, it becomes more reasonable to replace the aging degradation of the insulating film by the aging degradation of the electrical connection between the terminals, and the electrical connection between the terminals can be detected more accurately as a location of a conduction failure A detector may be connected to the first terminal and may be configured to detect whether or not there is conduction between the mating conductive member and the first terminal. Thus, the detector can detect conduction between the mating conductive member.

In one embodiment, the detector is a notifier. Thus, the simply configured notifier can detect a location of a conduction failure.

The invention also relates to a terminal to be connected to a mating conductive member and including an insulating film provided at a position to be brought into contact with the mating conductive member. Accordingly, if a current flows in the first terminal connected to the mating conductive member across the insulating film, the aging degradation of the insulating film can be detected. By a simple method of replacing the aging degradation of the insulating film by the aging degradation of an electrical connection between the terminals under an equivalent environment, the electrical connection between the terminals can be detected as a location of a conduction failure. The insulating film in one embodiment contains zinc, alumite or enamel. Replacing the aging degradation of the insulating film by the aging degradation of an electrical connection between the terminals under an equivalent environment enables the electrical connection between the terminals to be detected as a location of a conduction failure.

The terminal may be a male terminal. The insulating film can be easily formed on a part of the male terminal to be inserted into a female terminal.

Objects, features, aspects and advantages relating to the invention disclosed in this specification become more apparent upon reading the following detailed description and upon reference to accompanying drawings.

DETAILED DESCRIPTION

An embodiment is described with reference to the accompanying drawings. Note that the drawings are schematic and mutual relationships of the sizes and positions of images respectively shown in different drawings are not necessarily correct and can be changed as appropriate.

Further, in the following description, similar constituent elements are denoted by the same reference signs and have similar terms and functions. Thus, those elements may not be described in detail in some cases.

A connector, a connection state detection system and a terminal according to this embodiment are described below. First, the configuration of a wire with terminal is described.
<Wire with Terminal>

Figure 1:
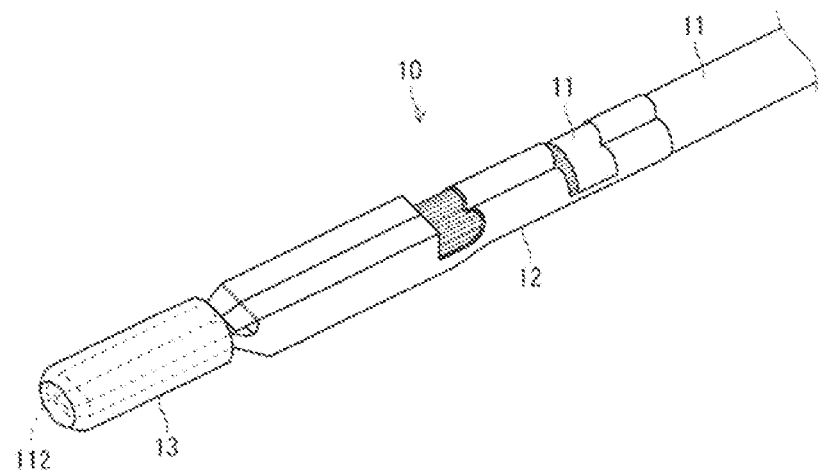
FIG. 1 is a view illustrating the structure of a wire with terminal according to an embodiment.

FIG. 1 is a view illustrating the structure of a wire with terminal. As illustrated in FIG. 1, the wire with terminal 10 includes a wire 11, a terminal 12 connected to an end part of the wire 11 and an insulating film 13 formed on the terminal 12.

The wire 11 includes a core, which is a wire material mainly containing a metal such as copper or aluminum, and an insulation coating covering the core. The insulation coating is, for example, a member made of synthetic resin mainly containing polyethylene, vinyl chloride or polyamide-based nylon.

The terminal 12 is connected to the end part of the wire 11. The terminal 12 is, for example, a metal member mainly containing a metal such as copper or tin. A method for connecting the terminal 12 and the wire 11 is, for example, crimping, welding or the like.

The insulating film 13 contains, for example, a material such as zinc, alumite or enamel. Here, enamel means a glassy material mainly containing silica (silicon dioxide). The insulating film 13 is formed in a part of a surface of the terminal 12 to be brought into contact with a paired terminal. In the terminal 12 illustrated in FIG. 1, i.e. a male terminal, the insulating film 13 is formed at least on a contact part with a paired female terminal, specifically on a part to be inserted into the female terminal. On the other hand, in a female terminal, the insulating film 13 is formed at least on a contact part with a paired male terminal, specifically on an inner wall of a hole part for accommodating the male terminal. Here, the insulating film 13 may be formed on both parts of a pair of wires with terminals to be brought into contact with paired terminals.

Note that although the insulating film 13 illustrated in FIG. 1 is formed on a part of the terminal 12 to be inserted into a female terminal except at a tip part 112, the insulating film 13 also may be formed to cover the tip part 112 of the terminal 12.

Figure 2:
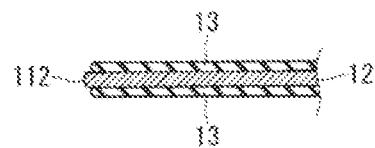
FIG. 2 is a section illustrating the structure of a terminal formed with insulating films according to the embodiment.

FIG. 2 is a section illustrating the structure of a terminal 12 formed with insulating films 13. In FIG. 2, the insulating films 13 are formed with upper and lower surfaces of the terminal 12.

Note that, depending on a contact mode with a paired female terminal, the insulating films 13 may not necessarily be formed on the entire upper surface of the terminal 12 and on the entire lower surface of the terminal 12. Specifically, the insulating films 13 may not be present at some positions on the upper and lower surfaces of the terminals 12.

<Concerning Configuration of Connector>

Figure 3:
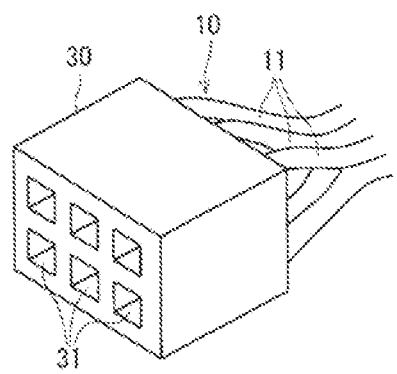
FIG. 3 is a perspective view illustrating the structure of a connector according to the embodiment.

FIG. 3 is a perspective view illustrating the structure of the connector. In FIG. 3, the connector includes a connector housing 30, the wire with terminal 10 to be accommodated into the connector housing 30, i.e. the wire with terminal 10 provided with the insulating film 13 formed on the terminal 12. Note that at least one wire with terminal 10 may be provided.

The connector housing 30 includes at least one cavity 31. In FIG. 3, the connector housing 30 includes a plurality of cavities 31. The wire with terminal 10 is accommodated into any one of the cavities 31. The wire with terminal 10 is connected to a paired wire with terminal in the cavity 31.

Normal wires with terminals may be accommodated in the cavities 31 different from the cavity 31 for accommodating the wire with terminal 10. The normal wire with terminal is a wire with terminal including the terminal 12 and the wire 11 and having no insulating film 13 formed on the terminal 12. The normal wire with terminal is accommodated into the cavity 31 different from the cavity 31 for accommodating the wire with terminal 10, and is connected electrically to a paired wire with terminal in this cavity 31.

Figure 4:
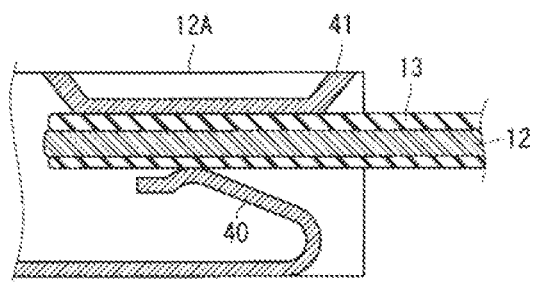
FIG. 4 is a section illustrating a pair of terminals connected to each other across an insulating film according to the embodiment.
Figure 5:
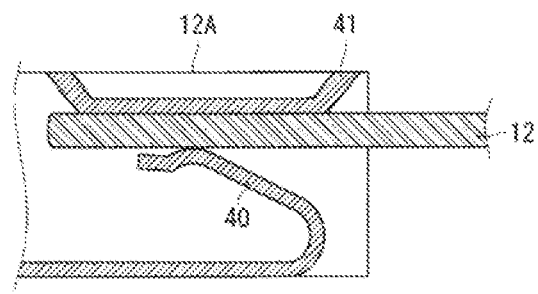
FIG. 5 is a section illustrating a pair of terminals connected to each other without any insulating film therebetween.
Figure 6:
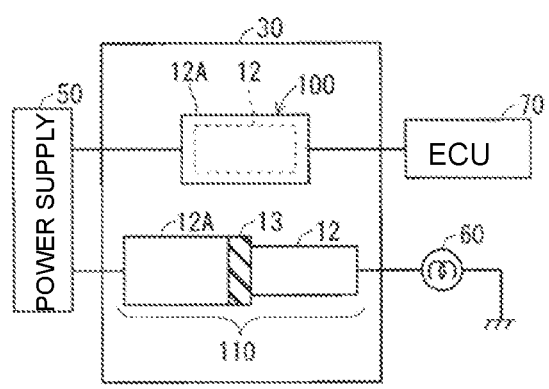
FIG. 6 is a circuit diagram conceptually illustrating a circuit configuration including a connection state detection system according to the embodiment.

FIGS. 4, 5 and 6 are sections illustrating a pair of terminals connected to each other.

In FIG. 4, a terminal 12 and a terminal 12A are connected across an insulating film 13. On the other hand, in FIG. 5, a terminal 12 and a terminal 12A are connected without any insulating film 13 therebetween, i.e. electrically connected.

The terminal 12A is paired with the terminal 12. In cases illustrated in FIGS. 4 and 5, the terminal 12A is a female terminal.

The terminal 12A includes a spring contact 40 made of metal and a ceiling plate 41 made of metal. The spring contact 40 is a resilient member deflectable in a direction away from the ceiling plate 41 that faces the spring contact 40.

In the case illustrated in FIG. 4, the terminal 12 formed with the insulating film 13 on the surface is inserted between the spring contact 40 and the ceiling plate 41. Then, the terminal 12 is held while being sandwiched between the spring contact 40 and the ceiling plate 41 indirectly across the insulating film 13. Thus, in the case illustrated in FIG. 4, the terminal 12 and the terminal 12A are not connected electrically.

On the other hand, in the case illustrated in FIG. 5, the terminal 12 having no insulating film 13 formed on the surface is inserted between the spring contact 40 and the ceiling plate 41. Then, the terminal 12 is held while being directly sandwiched between the spring contact 40 and the ceiling plate 41. In this state, the terminals 12 and 12A are connected electrically.

Note that the terminals 12 and 12A are connected directly or indirectly in the cavity 31 of the connector housing 30 if the terminals are accommodated in the cavity 31 of the connector housing 30.

FIG. 6 is a circuit diagram conceptually illustrating a circuit configuration including a connection state detection system. As conceptually illustrated in FIG. 6, a connection structure 100 in which terminals 12 and 12A are connected electrically and a connection structure 110 in which terminals 12 and 12A are connected across an insulating film 13 are accommodated respectively in cavities in a connector housing 30. Note that the structure of the cavities is not shown for simplification.

As illustrated in FIG. 6, a wire extending from the terminal 12A of the connection structure 100 is connected to a power supply 50. Further, a wire extending from the terminal 12A of the connection structure 110 also is connected to the power supply 50. Note that the wire extending from the terminal 12A of the connection structure 100 and the wire extending from the terminal 12A of the connection structure 110 may be connected to different power supplies.

Further, as illustrated in FIG. 6, a wire extending from the terminal 12 of the connection structure 100 is connected to an electronic control unit (ECU) 70. Further, a wire extending from the terminal 12 of the connection structure 110 is connected to a detector and, further, an indicator 60 serving as a notifier on an end part opposite to the terminal 12.

The indicator 60 is, for example, a light emitting diode (LED) for emitting light at a predetermined voltage value. However, the indicator 60 may be an indicator for notification by another method such as emission of sound at a predetermined voltage value.

As described above, in the connection structure 110, the terminals 12 and 12A are not connected electrically. The insulating film 13 may be peeled off gradually from the terminal 12 due to aging degradation caused by fretting wear. In this situation, the terminal 12 is exposed and contacts the spring contact 40 or the ceiling plate 41. If this occurs, a current gradually flows between the power supply 50 and the indicator 60, and the indicator 60 is turned on.

The above decrease of the insulating film 13 between the terminals 12 and 12A due to aging degradation can be evaluated in correspondence with a conduction failure of the connection structure 100, in which the terminals 12 and 12A are electrically connected under an equivalent environment, due to aging degradation.

Specifically, the insulating film 13 is peeled off and decreases due to aging degradation caused by fretting wear or the like, whereas an oxide film is formed or the terminals are damaged, for example, by friction heat in a contact part of the terminals 12 and 12A of the connection structure 10 under an equivalent environment. Specifically, as the insulating film 13 decreases in the connection structure 110, a degree of the conduction failure in the connection structure 100 increases.

Accordingly, the detection of energization in the connection structure 110 occurring as a result of aging degradation can be replaced by the detection of the conduction failure due to aging degradation in the connection structure 100 under an equivalent environment.

If the configuration illustrated in FIG. 6 is adopted, the connection structure 100 can be estimated to have a conduction failure due to aging degradation if the indicator 60 connected to the connection structure 110 is turned on. Since the indicator 60 is used to detect the conduction failure due to aging degradation, a complicated operation, such as a change of a circuit in the ECU, is not necessary. Further, since it is sufficient to notify only in the case of energization, a simple configuration such as the indicator 60, which is an LED, is sufficient.

The connection structures 100, 110 desirably are formed in different cavities 31 in the same connector housing 30. This is because a difference between an environment in which the insulating film 13 is degraded with time and an environment in which the connection structure 100 having the electrically connected terminals 12 and 12A is degraded with time become smaller. The smaller the difference between the two environments, the higher the detection accuracy of the conduction failure of the connection structure 100.

By adjusting a threshold value (voltage value or the like) for turning on the indicator 60, a decreasing degree of the insulating film at which the occurrence of a conduction failure of the connection structure 100 is estimated can be changed.

Further, by adjusting a thickness of the insulating film 13 in forming the insulating film 13, a time until the insulating film 13 decreases and the terminals directly contact each other can be adjusted.

By making the above adjustments, it is also possible to warn the connection structure 100 having a high probability of a conduction failure in advance by turning on the indicator 60 before the conduction failure of the connection structure 100 occurs.

Figure 7:
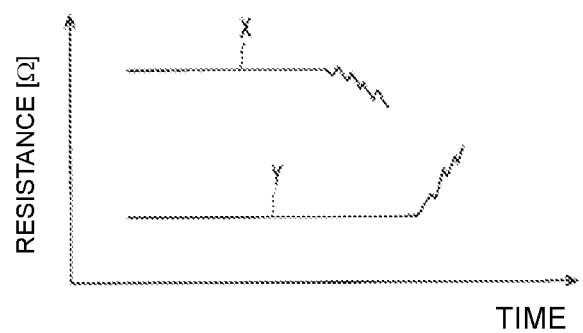
FIG. 7 is a log-log graph illustrating a relationship between a resistance value in a circuit and time according to the embodiment.

FIG. 7 is a log-log graph illustrating a relationship between a resistance value in a circuit and time. In FIG. 7, a vertical axis represents the resistance value and a horizontal axis represents time. X in FIG. 7 is a graph representing a resistance value of the connection structure 110 and Y in FIG. 7 is a graph representing a resistance value of the connection structure 100.

As illustrated by X of FIG. 7, the resistance value of the connection structure 110 is high at the beginning since the terminals 12 and 12A are connected across the insulating film 13. However, due to a decrease of the insulating film 13 caused by aging degradation, a current gradually flows and, accordingly, the resistance value also decreases.

On the other hand, as illustrated by Y of FIG. 7, the resistance value of the connection structure 100 is low at the beginning since the terminals 12 and 12A are directly connected. However, the resistance value gradually increases due to the formation of an oxide film caused by aging degradation, the damage of the terminals or the like.

As described above, a timing at which X of FIG. 7 indicates a decrease of the resistance value can be made earlier than a timing at which Y of FIG. 7 indicates an increase of the resistance value, desirably the timing at which X of FIG. 7 indicates a decrease of the resistance value can be set immediately before the timing at which Y of FIG. 7 indicates an increase of the resistance value by adjusting at least one of the threshold value for turning on the indicator 60 and the thickness of the insulating film 13.

Figure 8:
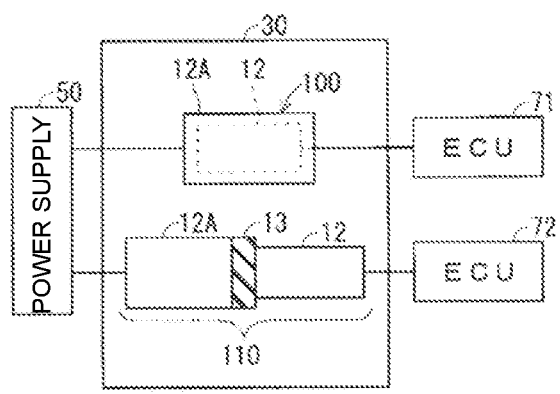
FIG. 8 is a circuit diagram conceptually illustrating another circuit configuration including a connection state detection system according to the embodiment.

FIG. 8 is a circuit diagram conceptually illustrating another circuit configuration including a connection state detection system. As conceptually illustrated in FIG. 8, connection structures 100 and 110 are accommodated respectively in cavities in a connector housing 30.

As illustrated in FIG. 8, a wire extending from a terminal 12A of the connection structure 100 is connected to a power supply 50. Further, a wire extending from a terminal 12A of the connection structure 110 is also connected to the power supply 50. Note that the wire extending from the terminal 12A of the connection structure 100 and the wire extending from the terminal 12A of the connection structure 110 may be connected to different power supplies.

Further, as illustrated in FIG. 8, a wire extending from a terminal 12 of the connection structure 100 is connected to an ECU 71. Further, a wire extending from a terminal 12 of the connection structure 110 is connected to an ECU 72 serving as a detector.

In the ECU 72, a change of a resistance value can be detected from a voltage value, a change of a current value or the like in the connection structure 110. Thus, detection can be made not only for a circuit in which the voltage value is positive in the case of energization in the connection structure 110, but also for a circuit in which the voltage value is 0 in the case of energization in the connection structure 110, a circuit in which the voltage value is negative in the case of energization in the connection structure 110 or the like. Thus, a conduction failure of the connection structure 100 can be more flexibly judged. Further, the ECU 72 can control the operation of the other ECU 71, e.g. control to display a warning or stop a drive operation based on a change of the resistance value in the connection structure 110.

Figure 9:
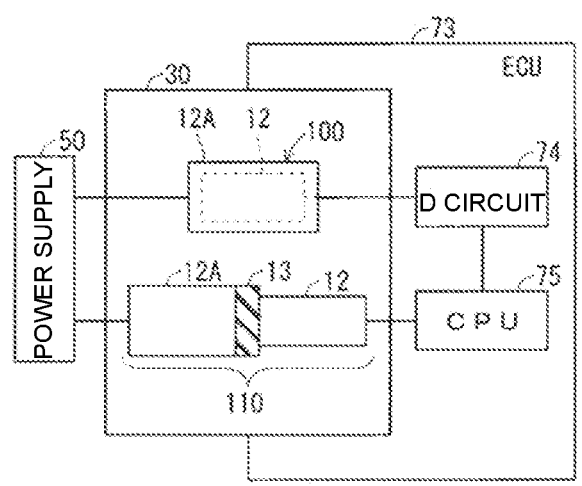
FIG. 9 is a circuit diagram conceptually illustrating another circuit configuration including a connection state detection system according to the embodiment.

FIG. 9 is a circuit diagram conceptually illustrating another circuit configuration including a connection state detection system. As conceptually illustrated in FIG. 9, connection structures 100 and 110 are respectively accommodated in cavities in a connector housing 30.

As illustrated in FIG. 9, a wire extending from a terminal 12A of the connection structure 100 is connected to a power supply 50. Further, a wire extending from a terminal 12A of the connection structure 110 is also connected to the power supply 50. Note that the wire extending from the terminal 12A of the connection structure 100 and the wire extending from the terminal 12A of the connection structure 110 may be connected to different power supplies.

Further, as illustrated in FIG. 9, a wire extending from a terminal 12 of the connection structure 100 is connected to a drive circuit 74 in an ECU 73. Further, a wire extending from a terminal 12 of the connection structure 110 is connected to a central processing unit (CPU) 75 in the ECU 73.

In the CPU 75 serving as a detector, a change of a resistance value can be detected from a voltage value, a change of a current value or the like in the connection structure 110. Further, the CPU 75 can execute a control, such as an operation control of the drive circuit 74, the display of a warning or the stop of a drive operation, based on a change of the resistance value in the connection structure 110.

<Effects Produced by Embodiment Described Above>

Next, effects produced by the embodiment described above are illustrated. Note that although the effects are described below based on the specific configuration illustrated in the embodiment described above, the specific configuration may be replaced by the other specific configuration illustrated in this specification within such a range that similar effects are produced.

According to the embodiment described above, the connector includes the connector housing 30 having the cavity 31 and a first terminal. Here, the terminal 12 corresponds to the first terminal. The terminal 12 is connected to a mating conductive member across the insulating film 13 and accommodated into the cavity 31. Here, the terminal 12A corresponds to the mating conductive member.

According to this configuration, a location of a conduction failure due to aging degradation or the like can be detected by a simple method. Specifically, the aging degradation of the insulating film 13 can be detected if a current flows in the terminal 12 connected to the mating terminal 12A across the insulating film 13. By replacing the aging degradation of the insulating film 13 by the aging degradation of an electrical connection between the terminals under an equivalent environment, the connection structure 100 electrically connected under the equivalent environment can be detected as a location of a conduction failure.

Particularly, with a wiring harness considered to be mounted in an autonomous vehicle or the like, even if a conduction failure occurs, it cannot be expected in some cases that a driver manually deals with the conduction failure. Assuming such a case, it is desirable that a reduction of energization reliability can be detected before the occurrence of an electrical failure due to aging degradation by adjusting the threshold value for turning on the indicator 60 or the thickness of the insulating film 13.

Note that the other configurations illustrated in this specification besides these configurations can be omitted as appropriate. Specifically, the effects described above can be produced only by these configurations.

However, the effects described above can be similarly produced even if at least one of the other configurations illustrated in this specification is appropriately added to the above configurations, i.e. even if the other configuration(s) illustrated in this specification, but not described as the above configurations is/are added to the above configurations.

The connector housing 30 includes the plurality of cavities 31. The connector further includes a second terminal to be electrically connected to the terminal 12A of the normal wire with terminal and to be accommodated in the cavity 31 different from the one for accommodating the wire with terminal 10. Here, the terminal 12 of the normal wire with terminal corresponds to the second terminal. According to this configuration, the wire with terminal 10 and the normal wire with terminal are both accommodated in different cavities 31 in the same connector housing 30. Thus, the connection structures 100 and 110 are placed in similar environments. Therefore, it becomes more reasonable to replace the aging degradation of the insulating film 13 by the aging degradation of the electrical connection between the terminals, and the electrically connected connection structure 100 can be more accurately detected as a location of a conduction failure.

The detector is a notifier. According to this configuration, a location of a conduction failure can be detected using the simply configured notifier such as the indicator 60. Since it is sufficient to notify in the case of energization, a simple configuration such as the indicator 60 is sufficient.

The terminal 12 to be connected to the mating terminal 12A includes the insulating film 13 provided at the position to be brought into contact with the terminal 12A. According to this configuration, a location of a conduction failure due to aging degradation or the like can be detected by a simple method. Specifically, if a current flows in the terminal 12 connected to the mating terminal 12A across the insulating film 13, the aging degradation of the insulating film 13 can be detected. By replacing the aging degradation of the insulating film 13 by the aging degradation of an electrical connection between the terminals under an equivalent environment, the connection structure 100 electrically connected under the equivalent environment can be detected as a location of a conduction failure.

The terminal 12 is a male terminal. According to this configuration, the insulating film 13 can be easily formed on a part of the male terminal to be inserted into a female terminal.

<Modifications of Embodiment Described Above>

Although the materials, dimensions, shapes, relative arrangement relationships, execution conditions and the like of the respective constituent elements are described in the embodiment described above, these are all illustrative in all aspects and not limited to those described in this specification.

Accordingly, numerous unillustrated modifications are possible within the scope of the technique disclosed in this specification. For example, these modifications include cases of deforming, adding or omitting at least one constituent element.

As long as no contradiction occurs, "one" constituent element described in the embodiment described above may be replaced by "one or more" constituent elements.

Furthermore, each constituent element in the embodiment described above is a conceptual unit, and cases where one constituent element is composed of a plurality of structures, one constituent element corresponds to a part of a certain structure and a plurality of constituent elements are provided in one structure are included within the scope of the technique disclosed in this specification.

Further, it is assumed that each constituent element in the embodiment described above includes structures having other configurations or shapes as long as the same function is exhibited.

Further, the description in this specification should be referred to for all purposes relating to this technique and is not construed as admitted prior art.

Further, if a material name is written without being particularly specified in the embodiment described above, materials containing other additive(s) such as alloys are also included as long as no contradiction occurs.

LIST OF REFERENCE SIGNS

10 . . . wire with terminal
11 . . . wire
12, 12A . . . terminal
13 . . . insulating film
30 . . . connector housing 31 . . . cavity
40 . . . spring contact
41 . . . ceiling plate
50 . . . power supply
60 . . . indicator
71, 72, 73 . . . ECU
74 . . . drive circuit
75 . . . CPU
100, 110 . . . connection structure
112 . . . tip part

The invention claimed is:

1. A connector, comprising:
a connector housing including first and second cavities; and
a first terminal accommodated in the first cavity, the first terminal being connected to a core of a first wire, the first terminal being provided with an insulating film in an entire range where one of the first terminal and a first mating conductive member is inserted into the other and to be connected to the first mating conductive member across the insulating film;
a second terminal accommodated in the second cavity, the second terminal having a wire mounting portion connected to a core of a second wire that has an insulation coating covering at least part of the core, the second terminal having no insulation in a range where one of the second terminal and a second mating conductive member is inserted into the other and to be connected to the second mating conductive member.

2. A connection state detection system, comprising:
the connector of claim 1; and
a detector connected to the first terminal and configured to detect whether or not there is conduction between the first mating conductive member and the first terminal.

3. The connection state detection system of claim 2, wherein the detector is a notifier.

4. The connector of claim 1, wherein the insulating film contains zinc.

5. The connector of claim 1, wherein the first terminal is a male terminal.

6. The connector of claim 1, wherein the insulating film contains alumite.

7. The connector of claim 1, wherein the insulating film contains enamel.

* * * * *